(12) United States Patent
Solomon et al.

(10) Patent No.: US 7,251,704 B2
(45) Date of Patent: Jul. 31, 2007

(54) STORE AND FORWARD SWITCH DEVICE, SYSTEM AND METHOD

(75) Inventors: Gary A. Solomon, Acton, MA (US); David Harriman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 316 days.

(21) Appl. No.: 10/226,838

(22) Filed: Aug. 23, 2002

(65) Prior Publication Data

US 2004/0039986 A1 Feb. 26, 2004

(51) Int. Cl.
*G06F 13/00* (2006.01)
*G06F 3/00* (2006.01)
*G06F 5/00* (2006.01)
*G06F 13/36* (2006.01)
*G06F 11/00* (2006.01)

(52) U.S. Cl. .......................... 710/316; 710/30; 710/52; 710/306; 714/52

(58) Field of Classification Search ............... 710/38, 710/52, 316–317, 30, 305; 714/52, 758, 714/799, 800–801, 807; 370/218, 242, 244, 370/389, 392, 912
See application file for complete search history.

(56) References Cited

U.S. PATENT DOCUMENTS

| | | | |
|---|---|---|---|
| 5,953,335 A * | 9/1999 | Erimli et al. ............... | 370/390 |
| 6,275,888 B1 * | 8/2001 | Porterfield .................. | 710/312 |
| 6,763,034 B1 * | 7/2004 | Jones et al. ................. | 370/463 |
| 2002/0091841 A1 * | 7/2002 | Beukema et al. ........... | 709/229 |
| 2003/0115513 A1 * | 6/2003 | Harriman et al. ............ | 714/49 |
| 2003/0158992 A1 * | 8/2003 | Ajanovic et al. ........... | 710/305 |

OTHER PUBLICATIONS

Meggyesi, Zoltan. "Fibre Channel Overview". CERN High Speed Interconnect Pages. Aug. 15, 1994. Retrieved from Internet Oct. 13, 2004. <http://hsi.web.cern.ch/HSI/fcs/spec/overview.htm>.*
"graphics adaptor". The Free On-Line Dictionary of Computing. Sep. 16, 1996. Retrieved from Internet Oct. 13, 2004. <http://foldoc.doc.ic.ac.uk/foldoc/foldoc.cgi?graphics+adaptor>.*
"Small Computer System Interface". The Free On-Line Dictionary of Computing. Mar. 30, 1999. Retrieved from Internet Oct. 13, 2004. <http://foldoc.doc.ic.ac.uk/foldoc/foldoc.cgi?query=scsi>.*
Schmid, Patrick. "Back To The Future: Serial ATA Arrives At Last". Tom's Hardware Guide. Aug. 12, 2002. Retrieved from Internet Oct. 13, 2004. <http://tomshardware.com/storage/20020812>.*
Bhatt, Ajay V. "Creating a Third Generation I/O Interconnect". Compaq Computer Corporation et al. Apr. 9, 2002.*
PCI Express Base Specification. Revision 1.0. Apr. 29, 2002. PCI Special Interest Group. Chapters 1, 2, and 7. pp. 1-116and 335-382.*

(Continued)

*Primary Examiner*—Glenn A. Auve
*Assistant Examiner*—Thomas J. Cleary
(74) *Attorney, Agent, or Firm*—Blakely, Sokoloff, Taylor & Zafman LLP

(57) ABSTRACT

Disclosed are a system and method for forwarding data packets from ingress ports to egress ports on a switch. A forwarding circuit may commence forwarding data packets from an ingress port through a switch fabric to a transmit queue of an egress port prior to completion of a checksum operation.

27 Claims, 12 Drawing Sheets

OTHER PUBLICATIONS

IEEE Standards for Local and Metropolitan Area Networks: Virtual Bridged Local Area Networks. IEEE Std 802. 1Q-1998. Dec. 8, 1998. The Institute of Electrical and Electronics Engineers. ISBN 0-7381-1537-1.*

IEEE Standard for Local and Metropolitan Area Networks—Virtual Bridged Local Area Networks—Amendment 2: VLAN Classification by Protocol and Port. IEEE Std 802.1v-2001 (Amendment to IEEE Std 802.1Q-1998). Mar. 17, 2001. The Institute of Electrical and Electronics Engineers. ISBN 0-7381-2818-X.*

Chiang, John. "Advanced Switching Versus PCI Express For Peer-to-Peer Communications". ASI-SIG. Online May 11, 2004.*

"ASI SIG: White Papers" Webpage. ASI-SIG. Online May 11, 2004. Retrieved from Internet Sep. 22, 2006. <http://web.archive.org/web/20040511193122/http://www.asi-sig.org/education/whitepapers>.*

Moore, Steve. "Storage Systems Merge into the Express Lane—PCI Express". RTC Magazine. Online Jan. 2006. Retrieved from Internet Sep. 21, 2006. <http://www.rtcmagazine.com/home/print-this.php?id=100472>.*

'computer' in "The Microsoft Press Computer Dictionary", Second Edition. 1994. Microsoft Corporation. p. 87. ISBN 1-55615-597-2.*

PCI Express BAse Specification Revision 1.0, Jul. 16, 2002, 328 pages.

Graphics Adaptor. The Fee On-Line Dictionary of Computing. Sep. 16, 1996.

Small Computer System Interface. The Free On-Line Dictionary of Computing. Mar. 30, 1999.

Meggyesi. Fibe Channel Overview. CERN High Speed Interconnect Pages. Aug. 15, 1994.

Schmid. Back to the Future: Serial ATA Arrives At Last. Tom's Hardware Guide. Aug. 12, 2002.

PCI-to-PCI Bridge Architecture Specification, Revision 1.1, PCI Local Bus, Dec. 18, 1998, 148 pages.

PCI Express Base Specification Revision 1.0, Jul. 16, 2002, pp. 1-154 and pp. 311-328.

* cited by examiner

FIG. 6A

| | +0 | | | | | | | | +1 | | | | | | | | +2 | | | | | | | | +3 | | | | | | | |
|---|---|---|---|---|---|---|---|---|---|---|---|---|---|---|---|---|---|---|---|---|---|---|---|---|---|---|---|---|---|---|---|---|
| | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Byte 0 > | x 0 1 | | | | Type | | | | Et/El | | | | Length | | | | R | | | | TD Attribute | | | | Last DW BE | | | | 1st DW BE | | | |
| Byte 4 > | Address[31:2] | | | | | | | | | | | | | | | | | | | | | | | | | | | | | | R | |
| Byte 8 > | Source ID | | | | | | | | | | | | | | | | R | | | | Local Transaction ID | | | | Channel ID | | | | | | | |

FIG. 6B

| | +0 | | | | | | | | +1 | | | | | | | | +2 | | | | | | | | +3 | | | | | | | |
|---|---|---|---|---|---|---|---|---|---|---|---|---|---|---|---|---|---|---|---|---|---|---|---|---|---|---|---|---|---|---|---|---|
| | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Byte 0 > | x 0 1 | | | | Type | | | | Et/El | | | | Length | | | | R | | | | TD Attribute | | | | Last DW BE | | | | 1st DW BE | | | |
| Byte 4 > | Address[63:32] | | | | | | | | | | | | | | | | | | | | | | | | | | | | | | | |
| Byte 8 > | Address[31:2] | | | | | | | | | | | | | | | | | | | | | | | | | | | | | | R | |
| Byte 12 > | Source ID | | | | | | | | | | | | | | | | R | | | | Local Transaction ID | | | | Channel ID | | | | | | | |

FIG. 6C

| | +0 | | | | | | | | +1 | | | | | | | | +2 | | | | | | | | +3 | | | | | | | |
|---|---|---|---|---|---|---|---|---|---|---|---|---|---|---|---|---|---|---|---|---|---|---|---|---|---|---|---|---|---|---|---|---|
| | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Byte 0 > | x 0 1 | | | | Type | | | | Et/El | | | | Length | | | | | | | | | | | | TD Attribute | | | | R | | Message Code | | | |
| Byte 4 > | Source ID | | | | | | | | | | | | | | | | R | | | | | | | | Address[63:32] | | | | | | | |
| Byte 8 > | Address[31:2] | | | | | | | | | | | | | | | | | | | | | | | R | | | | | | | | |
| Byte 12 > | Source ID | | | | | | | | | | | | | | | | R | | | | | | | | Local Transaction ID | | | | | | Channel ID | | |

FIG. 6D

| | +0 | | | | | | | | +1 | | | | | | | | +2 | | | | | | | | +3 | | | | | | | |
|---|---|---|---|---|---|---|---|---|---|---|---|---|---|---|---|---|---|---|---|---|---|---|---|---|---|---|---|---|---|---|---|---|
| | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Byte 0 > | x 0 1 | | | | Type | | | | Et | | | | R | | | | 0 | 0 | 0 | 0 | 0 | 0 | 0 | 0 | 0 | 0 | 0 | 0 | 1st DW BE | | | |
| Byte 4 > | Source ID | | | | | | | | Bus Number | | | | | | | | Device Number | | | | | | | | Function Number | | | Register Number | | | | R |
| Byte 8 > | Source ID | | | | | | | | | | | | | | | | R | | | | | | | | Local Transaction ID | | | | | | Channel ID | | |

| | 7 | 6 | 5 | 4 | 3 | 2 | 1 | 0 | 7 | Et | El | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|
| | +0 | | | | | | | | | | | +1 | | | | | | | | +2 | | | | | | | | +3 | | | | | | | |
| Byte 0 > | x 0 1 | | | Type | | | | | Target ID | Et | El | Length | | | | | | | | R | TD Attribute | | | | | | | R | | | | | Compl. Status | | |
| Byte 4 > | Source ID | | | | | | | | | | | | | | | | | | | R | Address[11:2] | | | | | | | | | | | | R | | |
| Byte 8 > | | | | | | | | | | | | | | | | | | | | R | Local Transaction ID | | | | | | | Channel ID | | | | | | | |

FIG. 6E

STORE AND FORWARD SWITCH DEVICE, SYSTEM AND METHOD

CROSS REFERENCE TO RELATED APPLICATION

The subject matter disclosed herein relates to copending U.S. patent application Ser. No. 10/005,895, filed on Nov. 2, 2001, Ser. No. 09/997,441, filed on Nov. 28, 2001, Ser. No. 10/040,702, filed on Dec. 28, 2001, and Ser. No. 10/041,040, filed on Dec. 28, 2001.

BACKGROUND

1. Field

The subject matter disclosed herein relates to the transmission of data packets. In particular, the subject matter disclosed herein relates to forwarding data packets from source devices to destination devices.

2. Information

Processing platforms typically comprise a host processing system, peripheral devices and an I/O system that enables communication between processes hosted on the host processing system and the peripheral devices. Such an I/O system is typically formed according to one or more standard I/O architectures such as, for example, the peripheral components interconnect (PCI) architecture according to the PCI Local Bus Specification, Rev. 2.2, Dec. 18, 1998, or PCI Express Base Specification, Rev. 1.0, Jul. 16, 2002, promoted by the PCI Special Interest Group.

A communication system may transmit messages or data packets between devices coupled by links according to a data link layer protocol. In such a system, a device may transmit messages or data packets to any of a plurality of other devices through a switch. The switch will typically receive messages or data packets from a source device at an ingress port and forward the messages or data packets to a destination device through an egress port. Prior to forwarding a received message or data packet, however, the switch typically performs a checksum operation on a portion of the received message or data packet to ensure the integrity of the received packet. Such a checksum operation typically introduces latencies in the process of forwarding the message or data packet from the source device to the destination device.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

FIGS. 6A through 6E show formats for a packet header received at ingress port according to an alternative embodiment of the switch shown in FIG. 3.

DETAILED DESCRIPTION

Figure 1:
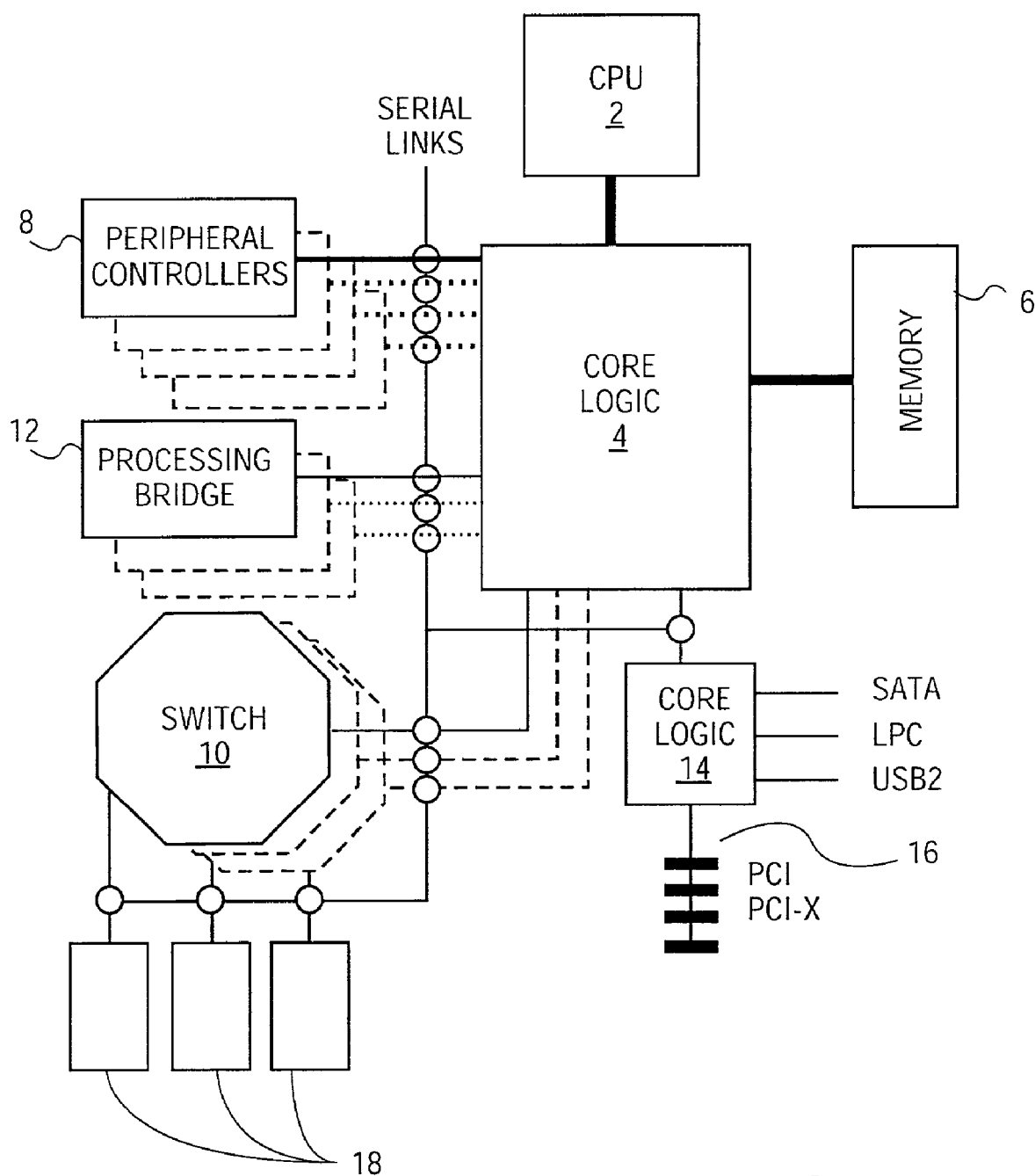
FIG. 1 shows a schematic diagram of a processing platform according to an embodiment of the present invention.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Machine-readable" instructions as referred to herein relates to expressions which may be understood by one or more machines for performing one or more logical operations. For example, machine-readable instructions may comprise instructions which are interpretable by a processor compiler for executing one or more operations on one or more data objects. However, this is merely an example of machine-readable instructions and embodiments of the present invention are not limited in this respect.

"Machine-readable medium" as referred to herein relates to media capable of maintaining expressions which are perceivable by one or more machines. For example, a machine readable medium may comprise one or more storage devices for storing data or machine-readable instructions. Such storage devices may comprise optical, magnetic or semiconductor media. However, these are merely examples of a machine-readable medium and embodiments of the present invention are not limited in this respect.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Also, logic may comprise machine-executable instructions stored in a machine-readable medium in combination with processing circuitry to execute such machine-executable instructions. However, these are merely examples of structures which may provide logic and embodiments of the present invention are not limited in these respects.

A "processing system" as discussed herein relates to a combination of hardware and software resources for accomplishing computational tasks. However, this is merely an example of a processing system and embodiments of the present invention are not limited in this respect. A "host processing system" as referred to herein relates to a processing system which may be adapted to communicate with a "peripheral device." For example, a peripheral device may provide inputs to or receive outputs from an application process hosted on the host processing system. However, these are merely examples of a host processing system and peripheral device, and embodiments of the present invention are not limited in these respects.

A "data bus" as referred to herein relates to circuitry for transmitting data between devices. For example, a data bus may transmit data between a host processing system and a peripheral device. However, this is merely an example and embodiments of the present invention are not limited in this respect. A "bus transaction" as referred to herein relates to an interaction between devices coupled in a bus structure wherein one device transmits data addressed to the other device through the bus structure.

A "port" as referred to herein relates to circuitry to transmit data to or receive data from a transmission medium. For example, a port may comprise circuitry to transmit data to or receive data from a transmission medium according to a data transmission protocol. However, this is merely an example of a port and embodiments of the present invention are not limited in this respect.

An "ingress" port as referred to herein relates to a port to receive data from a transmission medium according to a data transmission protocol. An "egress" port as referred to herein relates to a port to transmit data through a transmission medium toward a destination. However, these are merely examples of an ingress and egress port, and embodiments of the present invention are not limited in these respects.

A "data packet" as referred to herein relates to a unit of data that may be transmitted to a destination according to a data transmission protocol. A data packet may comprise a "header" portion and a "payload" portion. The payload portion may comprise content data that is to be processed by a destination device in support of an application. The header portion may comprise control information such as, for example, "destination information." However, this is merely an example of a data packet and embodiments of the present invention are not limited in this respect.

An egress port may be associated with a "transmit queue" to store data packets to transmit to a transmission medium through the egress port. A transmit queue may be formed from a memory to sequentially store data formatted for transmission over the transmission medium according to a data transmission protocol. Data packets in a transmit queue may be transmitted through an egress port according to ordering rules. However, this is merely an example of a transmit queue and embodiments of the present invention are not limited in this respect.

A "switch" as referred to herein relates to circuitry and logic to forward received data to one or more destinations. For example, a switch may comprise a plurality of ports and logic to forward data received on an ingress port to an egress port based upon destination information associated with the received data. However, this is merely an example of a switch and embodiments of the present invention are not limited in this respect.

A "link" as referred to herein relates to circuitry to transmit data between devices. A serial link may provide point to point communication between two devices in either unidirectionally or bi-directionally. Being limited to transmitting data between two points, a serial link may transmit data between the devices independently of address information. However, these are merely examples of a serial link and embodiments of the present invention are not limited in this respect.

"Routing information" as referred to herein relates to data associating destination addresses with physical destinations. For example, a "routing table" or "look up table" may comprise routing information to associate destination information in a data packet with a physical destination (e.g., a port of a switch or device coupled to a port of a switch). However, these are merely examples of routing information, a routing table and look up table, and embodiments of the present invention are not limited in these respects.

A switch may comprise a "switch fabric" providing circuitry and logic to forward data between ports. For example, a switch fabric may comprise logic to forward a data packet received on an ingress port to an egress port in response to destination information associated with the egress port. A switch may also comprise a "forwarding circuit" to initiate the forwarding of a received data packet through a switch fabric to an egress port in based upon destination information. For example, a forwarding circuit may associated the destination information with a particular egress port and initiate the forwarding of the received data packet through the switch fabric to the particular egress port. However, these are merely examples of a switch fabric and a forwarding circuit, and embodiments of the present invention are not limited in these respects.

An "enumeration procedure" as referred to herein relates to a process controlled by a processing system to allocate resources enabling communication between processes hosted on the processing system and devices coupled to an I/O system. For example, an enumeration process may allocate data buffers in a system memory of a processing system for transmitting data to or receiving data from devices coupled to an I/O system. Also, an enumeration procedure may also initialize device drivers on the processing system corresponding with devices coupled to the I/O system. However, these are merely examples of an enumeration procedure and embodiments of the present invention are not limited in these respects.

A "configuration transaction" as referred to herein relates to an event in an enumeration procedure to allocate resources to a device coupled to a data bus or allocate resources to a device function. A configuration transaction may provide information to a processing system identifying a device or device function to enable allocation of resources to the device or device function. However, this is merely an example of a configuration transaction and embodiments of the present invention are not limited in this respect.

An enumeration procedure may initiate a configuration transaction by transmitting a "configuration request" addressed to a device or device function. For example, an enumeration procedure may initiate a bus transaction addressed to a targeted device or device function to initiate a configuration transaction to allocate resources to communicate with the targeted device or device function. However this is merely an example of a configuration request and embodiments of the present invention are not limited in this respect.

"Configuration header" as referred to herein relates to data provided by a device in response to a configuration request. For example, a device may provide a configuration header as formatted data comprising data fields with information identifying the device and/or resource requirements of one or more functions of the device in response to a request. However, this is merely an example of a configuration header and embodiments of the present invention are not limited in this respect.

A "system bus" as referred to herein relates to a data bus in a processing system coupling hardware resources of a processing system. For example, a system bus may comprise a data bus to couple a central processing unit (CPU) and main memory of a processing system. However, this is merely an example of a system bus and embodiments of the present invention are not limited in this respect.

A "bridge" as referred to herein relates to circuitry or logic coupled between a data bus and one or more devices to enable transmission of data between the data bus and the devices. For example, a bridge may enable devices to communicate with a data bus according to a protocol native to the data bus. However, this is merely an example of a bridge and embodiments of the present invention are not limited in this respect.

A bridge may be coupled to a processing system through a "primary bus." Such a bridge may also be coupled to a "secondary bus" to transmit data between the bridge and devices coupled to the secondary bus. Accordingly, the bridge may transmit data from devices coupled to the secondary bus toward the processing system through the primary bus. Similarly, the bridge may transmit data received from the processing system on the primary bus to devices coupled to the secondary bus. However, these are merely examples of primary and secondary busses coupled to a bridge, and embodiments of the present invention are not limited in these respects.

A "host bridge" as referred to herein relates to a bridge coupled between a system bus and an I/O system. For example, a host bridge may enable communication between a hardware resources of a processing system coupled to a system bus and one or more devices coupled to a hub or second data bus. However, this is merely an example of a host bridge and embodiments of the present invention are not limited in this respect.

A "root device" as referred to herein relates to a device to transmit data between a processing system and an input/output (I/O) system. Such a root device may comprise hub circuitry coupled to a system bus of a processing system to transmit data between processes hosted on the processing system and devices coupled to an I/O system. Also, a root device may comprise a host bridge coupling such a system bus to I/O devices. However, this is merely an example of a root device and embodiments of the present invention are not limited in this respect.

A switch may be coupled to a processing system through a root device at an "upstream port" and coupled to other devices through one or more "downstream ports" to transmit data between the other devices and the processing system. Such a switch may also transmit data between the other devices through respective downstream ports. However, these are merely examples of an upstream port and a downstream port, and embodiments of the present invention are not limited in these respects.

A "cyclic redundancy code" (CRC) as referred to herein relates to a set of bits combined with digital data in a data transmission message. At a receiving point for the data transmission message, a predefined "checksum" operation may be performed on a CRC to indicate the reliability of digital data in a received data transmission message. However, this is merely an example of a CRC and a checksum operation to validate a data transmission from a CRC, and embodiments of the present invention are not limited in these respects.

Briefly, an embodiment of the present invention is directed to a switch comprising a plurality of ports and a forwarding circuit. The forwarding circuit may commence forwarding data packets from an ingress port through a switch fabric to a transmit queue of an egress port prior to completion of a checksum operation. However, this is merely an example embodiment and other embodiments of the present invention are not limited in these respects.

FIG. 1 shows a schematic diagram of a processing platform according to an embodiment of the present invention. A CPU 2 and system memory 6 are coupled to communicate with peripheral devices through core logic 4 providing a root device. The core logic 4 may comprise a memory bridge or a memory controller hub (MCH) made by Intel Corporation. However, this is merely an example of a root device and embodiments of the present invention are not limited in this respect. Peripheral devices coupled to the core logic 4 may include, for example, one or more communication ports 8, one or more processing bridges 12 (e.g., coupled to input/output (I/O) devices such as a storage processor), an I/O controller hub 14 and a switch 10. In the illustrated embodiment, the I/O hub controller 14 may also be coupled to devices adapted to communicate with processes hosted on the CPU 2 and system memory 6 according to a device protocol such as, for example, a Universal Serial Bus protocol or peripheral components interconnect protocol (PCI) (e.g., according to the PCI Local Bus Specification, Rev. 2.2, Dec. 18, 1998, PCI Special Interest Group, hereinafter the "PCI Local Bus Specification"). Additionally, each switch 10 may be coupled to one or more devices 18. However, this is merely an example of a processing platform and embodiments of the present invention are not limited in this respect.

Each switch 10 may comprise an upstream port coupled to the core logic 4 and a plurality of downstream ports coupled to devices 18. According to an embodiment, the switch 10 may facilitate upstream and downstream communication between a device 18 and the core logic 4 through the upstream port. The switch 10 may also facilitate direct peer-to-peer communication between devices 18 through corresponding downstream ports independently of the core logic 4. The switch 10 may receive data from the core logic 4 or devices 18 in a data message or data packet format indicating a destination. Accordingly, the switch 10 may comprise logic to determine an egress port for such a message or data packet based upon destination data associated with the data message or data packet. However, this is merely an embodiment of a switch as implemented in a processing platform and embodiments of the present invention are not limited in this respect.

According to an embodiment, destination data may comprise any data that may be associated with an egress port of the switch 10. For example, such destination data may comprise a information identifying a bus segment (e.g., bus number) or serial link for a configuration request packet or split completion packet. Also, destination data in a data message or data packet may comprise a memory map address as part of a non-configuration request packet. However, these are merely examples of destination data and embodiments of the present invention are not limited in these respects.

According to an embodiment, the devices 18 may comprise any one of several I/O devices such as, for example, an Ethernet controller coupled to a network, a small computer system interface (SCSI), a Serial ATA interface, a Fibre-channel interface or graphics controller interface. However, these are merely examples of devices which may be coupled to a downstream port of a switch and embodiments of the present invention are not limited in this respect.

According to an embodiment, the CPU 2 may execute one or more procedures to initialize the processing platform to enable processes hosted on the CPU 2 and system memory 6 to communicate with peripheral devices. For example, the CPU 2 may execute instructions stored in a non-volatile memory (not shown) as part of a basic I/O system (BIOS). Such instructions may be loaded to the system memory 6 and executed in response to a system reset event. Such BIOS instructions may initiate or control one or more enumeration processes to allocate resources to processes (e.g., initializing data bus drivers and device drivers) to communicate with corresponding data buses and devices by, for example, defining buffers in the system memory 6. However, this is merely an example of how a processing system may execute processes to initialize a processing platform and embodiments of the present invention are not limited in this respect.

In the illustrated embodiment, the switches 10 and devices 18 may be adapted to appear to the core logic 4 (and processes hosted on the CPU 2 and system memory 6) as a PCI devices as defined in the PCI Express Base Specification, Rev. 1.0, Jul. 16, 2002 (hereinafter the "PCI Express Specification"). In this embodiment, an enumeration procedure may allocate resources at the processing platform to communicate with the switch 10 as a "switch" device as provided in section 1.3.3 of the PCI Express Specification and devices 18 as "endpoints" as provided in section 1.3.2 of the PCI Express Specification. However, this is merely an example of how a processing system may be adapted to communicate with a switch and devices coupled to ports of the switch, and embodiments of the present invention are not limited in this respect.

According to an embodiment, the CPU 2 may execute an enumeration procedure to, among other things, allocate resources to communicate with the devices 18 coupled to downstream ports of a switch 10 through the upstream port of the switch 10 and establish routing information to forward data messages or data packets from the upstream ports to the downstream ports. The switch 10 may then comprise logic to transmit data from a source downstream port to a destination downstream port based upon the collective routing information that was established for forwarding data messages or data packets from the upstream port to the destination downstream port. However, this is merely an example of how a switch may forward a data message or data packet from a source downstream port to a destination downstream port and embodiments of the present invention are not limited in this respect.

Figure 2:
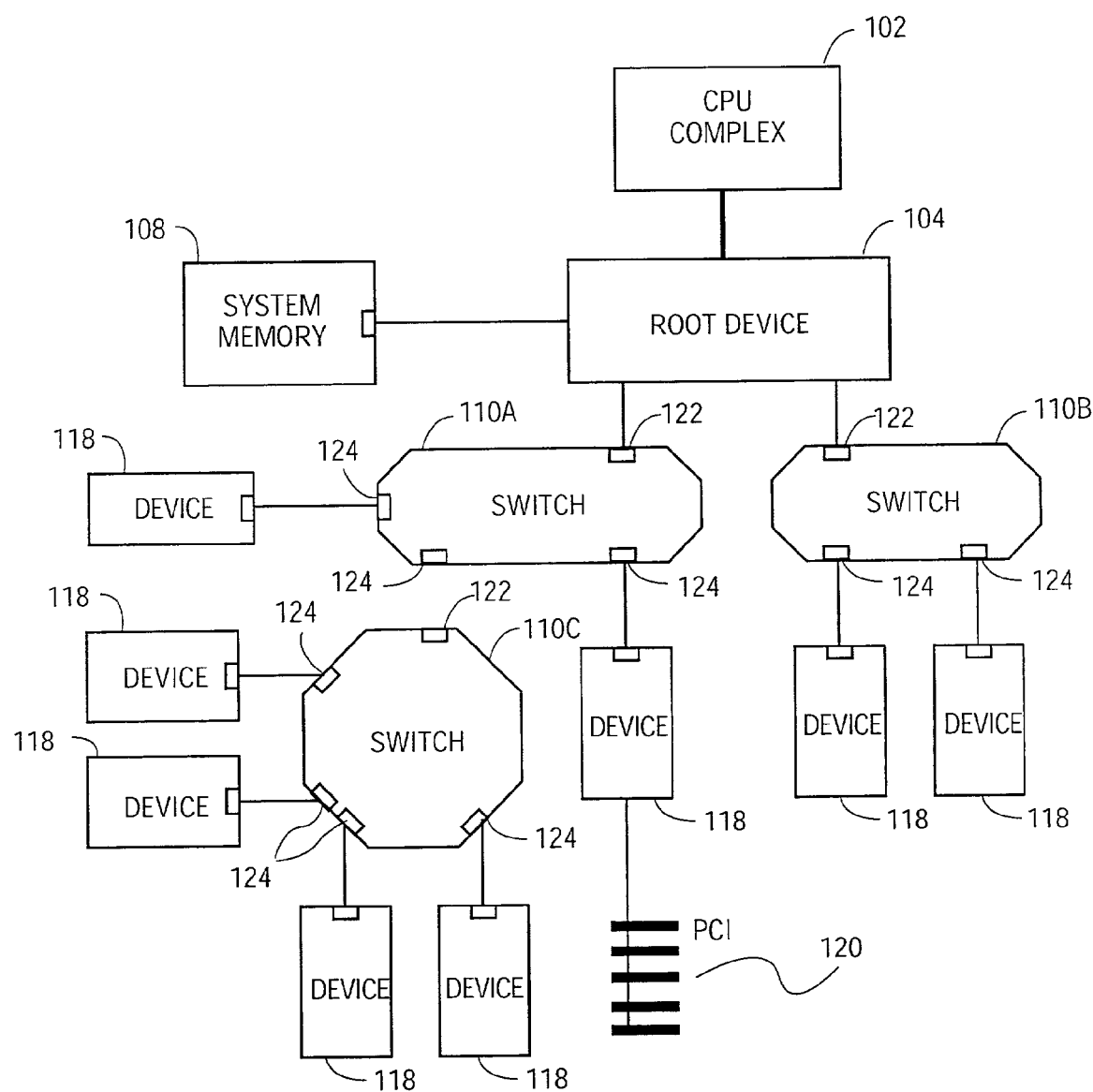
FIG. 2 shows a schematic diagram of a processing platform according to an alternative embodiment of the present invention.

FIG. 2 shows a schematic diagram of a processing platform according to an alternative embodiment of the present invention. A CPU complex 102 and system memory 108 may comprise a processing system (e.g., comprising one or more CPUs and system memory) which communicates with peripheral devices through a root device 104. Switches 110 each comprise an upstream port 122 and a plurality of downstream ports 124 coupled to devices 118. A device 118 may define an endpoint comprising circuitry to transmit data to or receive data from points on the processing platform. A device 118 may also define a bridge to a data bus of a legacy PCI system 120 according to the PCI Local Bus specification.

In the illustrated embodiment, a device 118 coupled to a downstream port 124 of a switch 110 may communicate with processes hosted on the CPU complex 102 through the upstream 122 of the switch 110. The CPU complex 102 may execute an enumeration procedure to configure the switches 110 and resources at the CPU complex 102 to enabling communication with the devices 118. Such an enumeration procedure may comprise a procedure to enumerate the switches 110 and devices 118 as a "switch" or "endpoint" device as provided in Section 7 of the PCI Express Specification.

In the illustrated embodiment, the upstream port 122 of the switch 110c is coupled to a downstream port 124 of the switch 110a. Accordingly, the switch 110a may act as a root device for the switch 110c and comprise logic to forward data messages or data packets from the switch 110c (e.g., data message or data packets originating at one of the devices 118 coupled to the switch 110c) to processes hosted at the CPU complex 102 through the upstream port 122 of the switch 110a. Similarly, the switch 110a may comprise logic to forward data messages or data packets from processes hosted on the CPU complex 102 (received on the upstream port 122 of the switch 110a) to the switch 110c and devices 118 coupled to downstream ports 124 of the switch 110c. However, these are merely examples of how a first switch may act as a root device to forward messages between a processing system and devices coupled to a second switch coupled to a downstream port of the first switch, and embodiments of the present invention are not limited in this respect.

According to an embodiment, devices 118 coupled to downstream ports 124 of the switch 110a may communicate with devices 118 coupled to the switch 110c independently of processes hosted on the CPU complex 102. For example, a device 118 coupled to a downstream port 124 of the switch 110c may transmit a data message or data packet to the switch 110c with destination data associated with a device 118 coupled to a downstream port 124 of the switch 110a. The switch 110c may then route the data message or data packet to the switch 110a through the (egress) upstream port 122 to be routed to the device 118 associated with the destination information. Similarly, a device coupled to a downstream port 124 of the switch 110a may transmit a data message or data packet to the switch 110a with destination data associated with a device 118 coupled to a downstream port 124 of the switch 110c. The switch 110a may then route the data message or data packet to the switch 110c through an egress downstream port 124 (of the switch 110a) to an ingress upstream port 122 (of the switch 110c) to be routed to the device 118 associated with the destination information. However, these are merely examples of how devices may forward data messages or data packets through switches and embodiments of the present invention are not limited in this respect.

According to an embodiment, the CPU complex 102 may execute an enumeration procedure to, among other things, allocate resources to communicate with the switches 110 and devices 118 coupled to downstream ports 124 of a switch 110 through the upstream port 122 of the switch 110. The enumeration procedure may also establish routing information to forward data messages or data packets from the upstream port 122 to the downstream ports 124. The switch 10 may then comprise logic to transmit data from a source downstream port 124 to a destination downstream port 124 based upon the routing information to forward data messages or data packets from the upstream port 122 to the destination downstream port 124. However, this is merely an example of how a switch may forward a data messages or data packet from a source downstream port to a destination downstream port and embodiments of the present invention are not limited in this respect.

Figure 3:
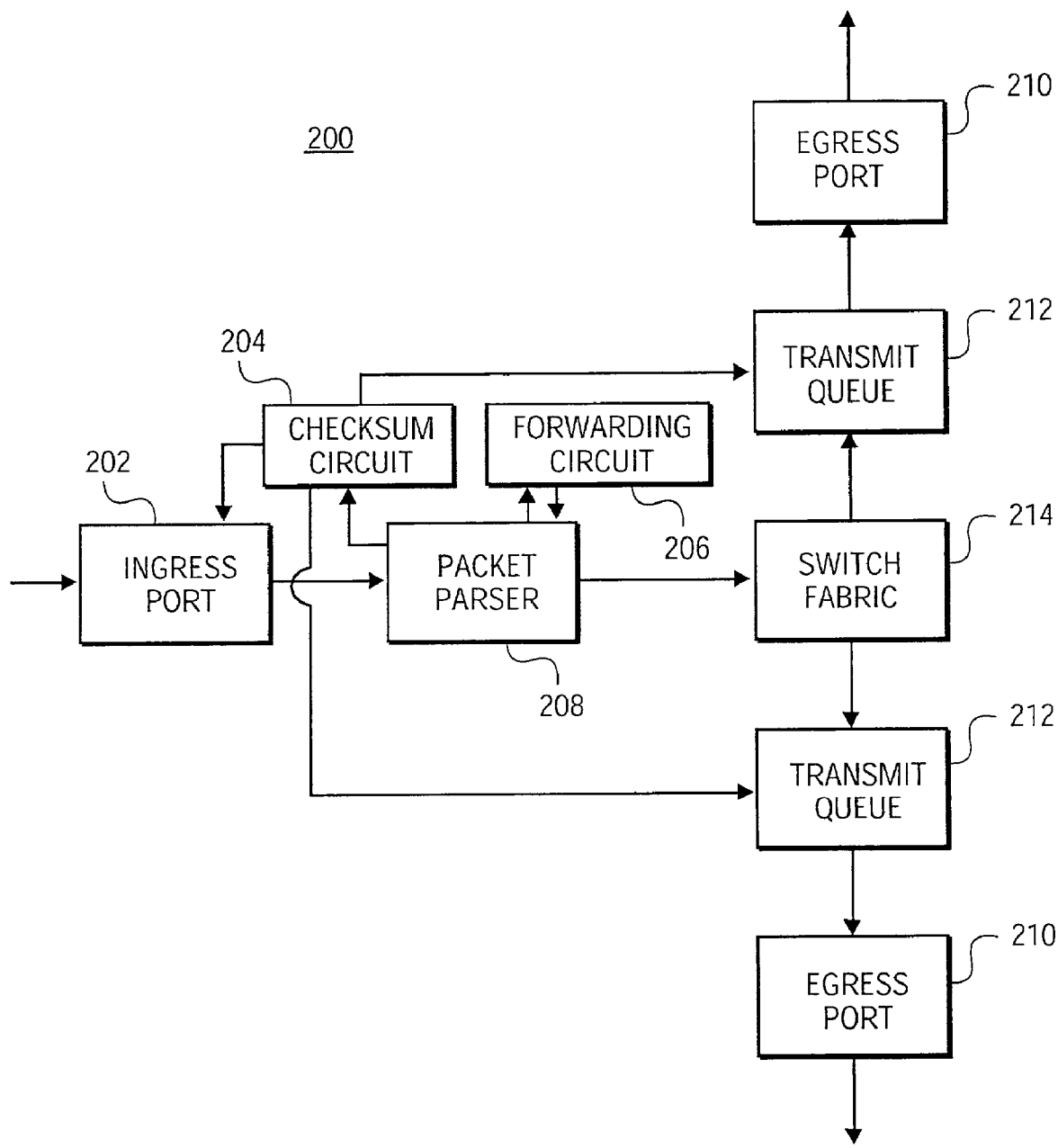
FIG. 3 shows a schematic diagram of a portion of a switch according to embodiments of the present invention shown in FIGS. 1 and 2.

FIG. 3 shows a schematic diagram of a portion of a switch 200 according to an embodiment of the switch 10 shown in FIG. 1 and switches 110 shown in FIG. 2. The switch 200 may comprise a plurality of ports coupled to links. In the presently illustrated embodiment, an egress port 202 receives data packets which may be forwarded to any of a plurality of egress ports 210. In one embodiment, any port of the switch 200 may be an ingress port 202 to receive data packets from an associated link or an egress port to transmit data packets on the link. In other embodiments, particular ports on the switch 200 may have fixed functionality as an ingress port or an egress port.

Figure 4:
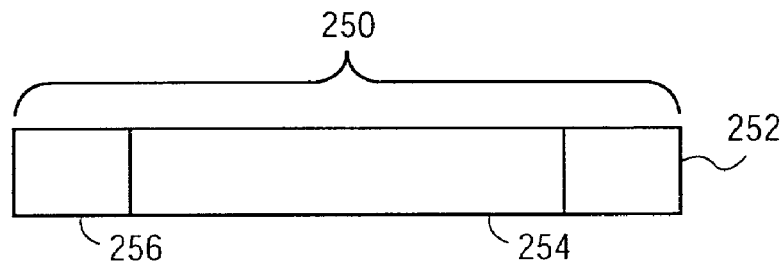
FIG. 4 shows a format of a data packet according to an embodiment of the switch shown in FIG. 3.

In the presently illustrated embodiment, the ports of the switch 200 may transmit or receive data packets on serial links coupled to devices according to a data packet format. FIG. 4 shows a format of a data packet 250 which may be received at an ingress port and forwarded to an egress port of the switch 200. The data packet 250 comprises a header portion 252, a payload portion 254 and a tail portion 256. The header portion 252 may comprise information associating the data packet 250 with a data packet type and destination information associated with a destination device to receive the data packet 250.

According to an embodiment, the data packet 250 may be associated with any one of several data packet types such as, for example, a request packet type or a completion packet type. However, these are merely examples of data packet types and embodiments of the present invention are not limited in these respects. In one embodiment, the header portion 252 may maintain destination information in different formats depending upon the data packet type associated with the data packet 250. Accordingly, the switch 200 may extract destination information from the header portion 252 based upon the associated data packet type. The tail portion 256 of the data packet 250 may comprise information such as, for example, a CRC or a packet valid symbol.

Figure 5A:
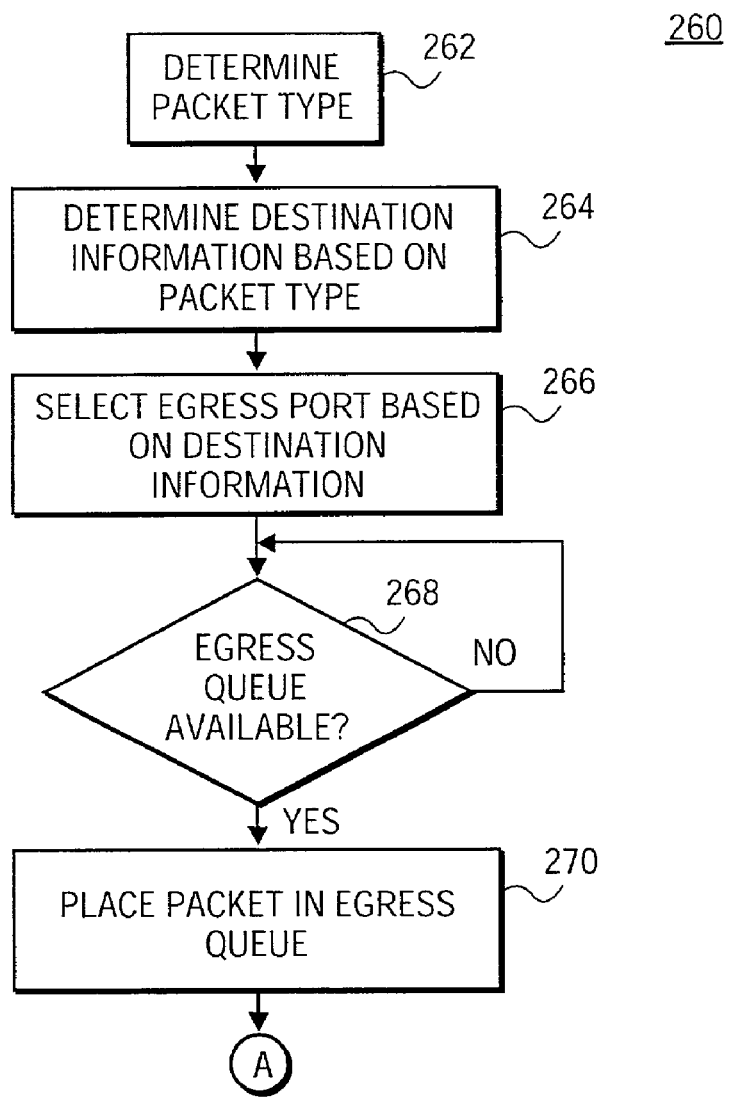
FIGS. 5A and 5B show a flow diagram illustrating a process to forward a data packet from an ingress port to an egress port according to an embodiment of the switch shown in FIG. 3.
Figure 5B:
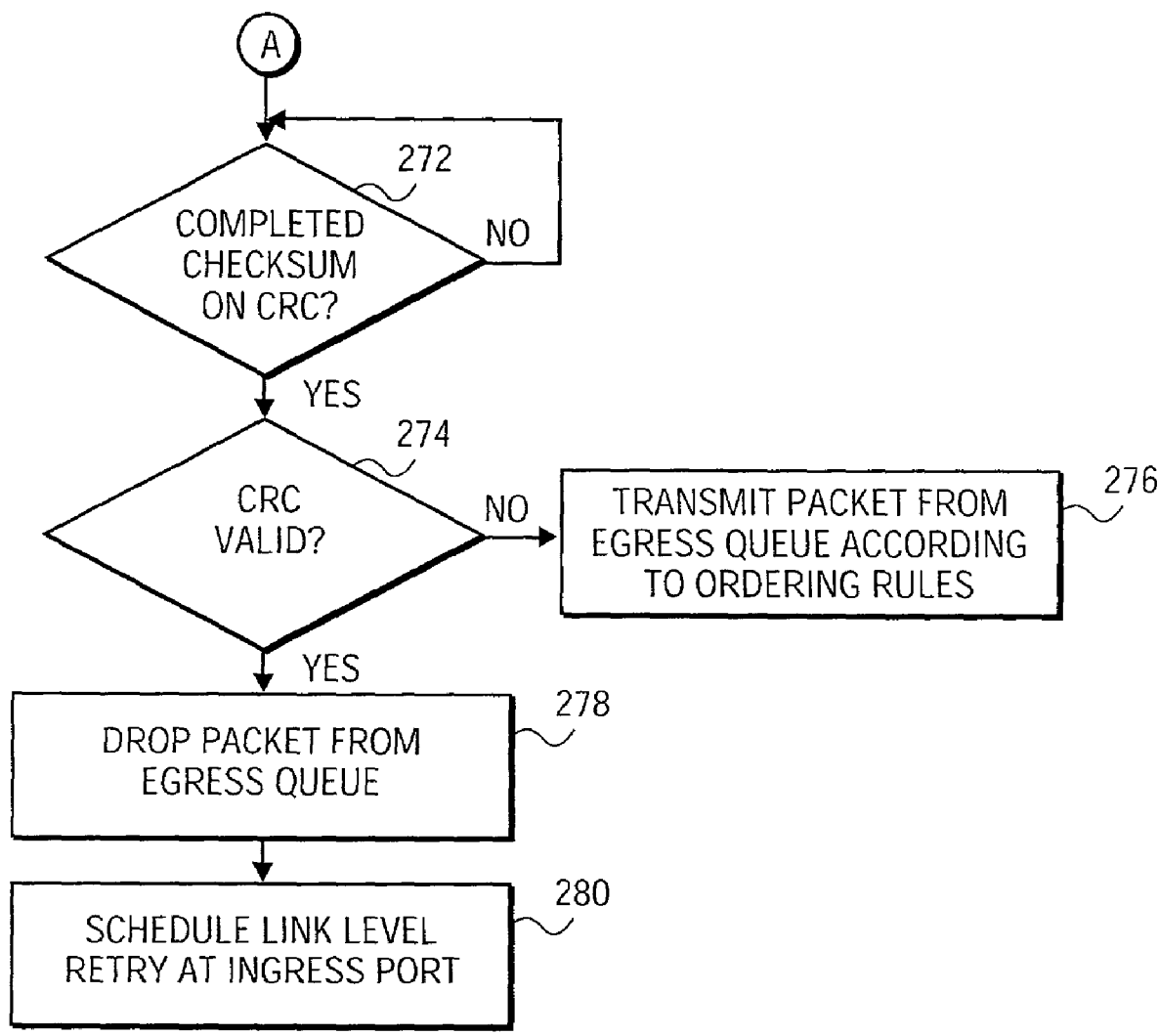

FIGS. 5A and 5B show a flow diagram illustrating a process to forward data packets from an ingress port to an egress port according to an embodiment of the present invention as illustrated in FIGS. 3 and 4. At block 262, the packet parser 262 may extract data packet type information from the header portion 252 of a data packet received at the ingress port 202 and initiate a checksum calculation on data in the received data packet at checksum circuit 204. Based upon the extracted data packet type information, at block 264 the packet parser 208 may associate the header portion 252 of the received data packet with a header format. The parser 208 may then extract destination information from particular fields in the header portion 252 based upon the header format.

At block 266, the packet parser 208 and forwarding circuit 206 may determine routing information from the extracted destination information (e.g., according to a look up table) and select an egress port 210 based upon the routing information. At block 268, the packet parser 208 may determine whether the transmit queue 212 (associated with the selected egress port 210) is capable of receiving the data packet. If the transmit queue 212 is capable of receiving the data packet (e.g., transmit queue not full), at block 270 the forwarding circuit 206 may then initiate the forwarding of the data packet through the switch fabric 214 to the transmit queue 212.

In the presently illustrated embodiment, it should be understood that the switch fabric 214 may forward the received data packet to the transmit queue 212 prior to completion of the checksum operation (initiated at block 264). The switch fabric 214 may begin "streaming" the leading portion of the received data packet to a transmit queue 212 upon a selection of the egress port 210 concurrently with execution of the checksum operation by the checksum circuit 204. Upon completion of the checksum operation at diamond 272, the checksum circuit 204 may provide a CRC status indication to the ingress port 202 and the selected transmit queue 212. If the CRC status is valid, the data packet may be transmitted from the selected transmit queue 212 through the corresponding egress port according to ordering rules at block 276. If the CRC status is invalid, the data packet may be dropped from the transmit queue at block 278 and the ingress port 202 may initiate a link level retry at block 280 for retransmission of the data packet to the ingress port 202. Upon dropping the invalid data packet, the selected transmit queue 212 may then re-adjust space availability to enqueue an additional data packet for transmission.

In an alternative embodiment, upon receipt of an invalid CRC status at diamond 274, the selected transmit queue 212 may insert a symbol in the tail portion 256 of the forwarded data packet indicating that the data packet is invalid. This may allow the egress port 210 to begin transmission of the data packet from the transmit queue 212 prior to receipt of an invalid CRC status from the checksum circuit 204 (provided that the symbol is inserted prior to the completion of transmission of the data packet from the transmit queue 212). A device receiving the data packet (not shown) may then recognize that the data packet is invalid from the inserted symbol and discard the data packet after being forwarded on a link. The receiving device may then initiate a link level retry for retransmission of the data packet from the switch 200. The switch 200 may then initiate a link level retry on the ingress port for retransmission of the data packet. The switch 200 may then satisfy the link level retry from the receiving device in response to receipt of the retransmitted data packet.

FIGS. 6A through 6E show formats for a packet header received at an ingress port of a switch according to an alternative embodiment of the data packet 250 shown in FIG. 4. Here, the ingress port may receive the data packet from a serial link according to a PCI (3GIO) format. It should be understood that the presently illustrated embodiment may be applied in forwarding 32-bit or 64-bit addressable Request packets (FIGS. 6A and 6B) as well as Configuration Request packets (FIG. 6D) and Request Completion Packets (FIG. 6E).

Each of the data packet headers comprise a symbol at byte 0 indicating a corresponding data packet type such as, for example, a request packet, a request completion packet or a configuration packet. However, these are merely examples of data packet types that may be indicated in a set field of a packet header and such a field may indicate other data packet types.

In the presently illustrated embodiment, different types of destination information in the packet header formats shown in FIGS. 6A through 6E may be associated with routing information to determine a destination transmit queue 212 and egress port 210. Based upon a particular data packet type, according to an embodiment, destination information may comprise a destination device identifier or a physical destination address (e.g., a PCI configuration address to locate a device or device function in an enumeration process, link layer address or an egress port number). It should be understood, however, that these are merely examples of destination information that may be associated with routing information (e.g., in a look up table) to select a destination transmit queue 212 and embodiments of the present invention are not limited in these respects.

Figure 7:
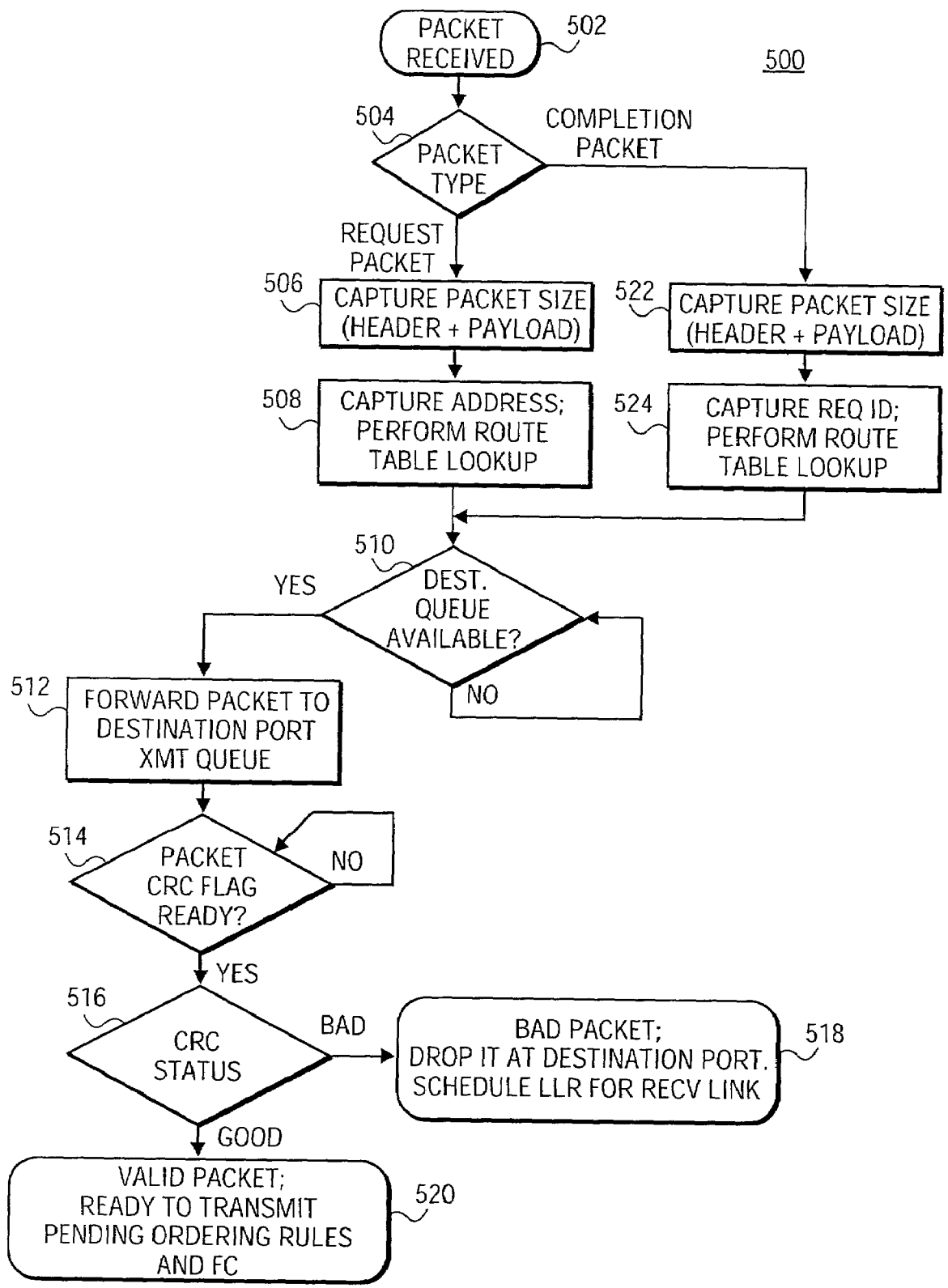
FIG. 7 shows a flow diagram illustrating a process to forward a data packet from an ingress port to an egress port according to an embodiment of the data packet headers shown in FIGS. 6A through 6E.

FIG. 7 shows a flow diagram illustrating an embodiment to process data packets received at an ingress port with headers formatted as illustrated in FIGS. 6A through 6E. Upon receipt of a data packet from a serial link at the ingress port 202, the packet parser 208 may extract data packet type information from the byte 0 location of the data packet header. At diamond 504, the received data packet may be classified as either a request packet or a request completion packet based upon the extracted data packet type information. At blocks 506 and 522, the packet parser 208 may determine the data packet size from the size of the packet header (based upon the extracted data packet type information) added to the size of the packet payload from the "length" field in bytes 1 and 2 of the packet header.

If the received data packet is classified as a request packet (e.g., as shown in FIGS. 6A and 6B), at block 508 the packet parser 208 may extract destination information (e.g., a destination address) at bytes 4 through 7 if the request packet uses 32-bit addressing or at bytes 4 through 11 if the request packet uses 64-bit addressing. The forwarding circuit 206 may then select an egress port from a look up table based upon routing information associated with the destination information.

If the received data packet is classified as a request completion packet (e.g., as shown in FIG. 6E), at block 508 the packet parser 208 may extract information from the packet header identifying the source of the underlying request from a "source ID" or "requester ID" field at bytes 8 and 9. The forwarding circuit 206 may then select an egress port from routing information in a look up table associating the source ID or Requestor ID with an egress port.

In addition to a "request" or "completion" data packet type, according to an embodiment, other data packet types may include a PCI configuration request (e.g., a configuration read or write request) where a header may comprise data identifying a physical configuration address (e.g., bus number, device number and/or device function number). Upon determining that the data packet is of a configuration request type, the physical configuration address may be associated with routing information in a look up table to identify an egress port. Responses to such a configuration request data packet may then be processed as a completion data packet type.

Upon selection of an egress port at either block 508 or 524, the received data packet may be forwarded to a transmit queue of the selected egress port at block 512 if the transmit queue is available to receive the data packet (diamond 510). It should be understood, however, that the forwarding of the data packet to the transmit queue of the egress port (e.g., through a switch fabric) may commence prior to execution of a checksum operation to determine a valid CRC. Transmission of the data packet from the transmit queue through the egress port may be suspended at diamond 514 until completion of the checksum operation. If the checksum operation validates the CRC portion of the data packet, the data packet may be transmitted from the transmit queue according to ordering rules at oval 520. Otherwise, if the checksum operation indicates an invalid CRC, the data packet may be dropped from the transmit queue and a link level retry may be initiated at the ingress port at oval 520.

In an alternative embodiment, transmission from the transmit queue may commence prior to validation of the CRC by the checksum operation (e.g., at diamond 514). In this embodiment, transmission from the transmit queue may not be suspended until receipt of a CRC validation. Instead, an invalid packet symbol may be inserted in the tail portion of the data packet prior to completion of transmission from the egress port. Upon receipt of the data packet transmitted from the egress port and detection of the invalid symbol, the receiving device may discard the received data packet and attempt a link level retry. Upon receipt of a re-transmitted data packet (in response to a link level retry at the ingress port of the switch), the re-transmitted data packet may be forwarded to the transmit queue and re-transmitted through the egress port.

Figure 8:
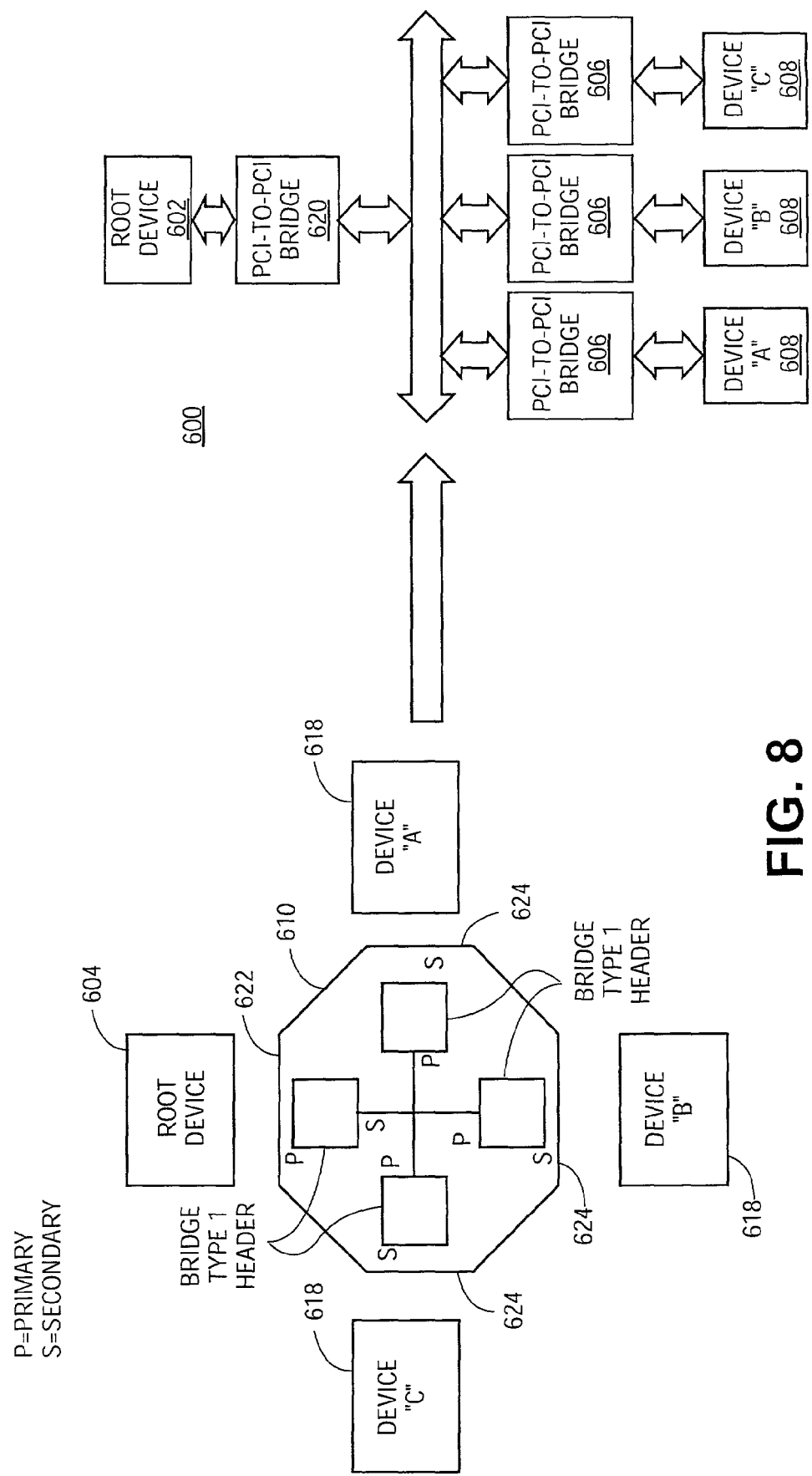
FIG. 8 shows a schematic diagram mapping of a multi-port switch to a representation of a PCI bus structure according to an embodiment of the switch shown in FIG. 3.

FIG. 8 shows a schematic diagram mapping of a multi-port switch to a representation of a "virtual" PCI bus structure according to an embodiment of the switch 200 shown in FIG. 3. A switch 610 may comprise an upstream port 622 coupled to a root device 604 and a plurality of downstream ports 624 coupled to respective devices 618. In one embodiment, the devices 618 may be PCI devices adaptable to provide an "endpoint" as described in the PCI Express Specification. Alternatively, the devices 618 may comprise other interfaces to communicate with the downstream ports 624 according to other protocols such as, for example, Infiniband, Rapid I/O or Hyper Transport protocols. However, these are merely examples of an interface for devices which may be coupled to a downstream port of a switch and embodiments of the present invention are not limited in these respects.

According to an embodiment, the switch 610 comprises logic and circuitry to forward data messages or data packets received on a source ingress port (e.g., the upstream port 622 or a downstream port 24) to a different destination egress port (e.g., the upstream port 622 or a downstream port 624). The switch 610 may comprise logic to associate the destination address information with routing information (e.g., routing information stored in a routing table or look-up table) to identify the destination egress port. However, this is merely an example of logic in a switch to forward data messages or data packets from an ingress port to an egress port, and embodiments of the present invention are not limited in this respect.

A processing system (not shown) may configure resources enabling processes hosted on the processing system to communicate with the devices 618 by executing an enumeration procedure. For example, the processing system may execute an enumeration procedure to configure resources to communicate with the switch 622 as PCI devices according to the PCI Local Bus Specification as illustrated in a virtual mapping 600. For example, routines in operating systems such as versions of Windows® sold by Microsoft Corporation, Linux, Solaris® sold by Sun Microsystems, or VxWorks® or pSOS® sold by WindRiver Systems, Inc. may execute an enumeration procedure to configure resources at the processing system according to the virtual mapping. However, these are merely examples of routines which may execute an enumeration procedure and embodiments of the present invention are not limited in this respect.

In the illustrated embodiment, the switch 610 may appear to the processing system as one or more devices coupled to a PCI bus at the root device 604. The switch 610 may comprise logic to respond to Type 0 or Type 1 configuration requests received at the upstream port 622 from a PCI enumeration procedure. In the course of an initial Type 0 configuration transaction, the switch 610 may provide a configuration header as illustrated in Chapter 3 of the PCI-to-PCI Bridge Architecture Specification, Rev. 1.1, Dec. 18, 1998, PCI Special Interest Group (hereinafter the "PCI-to-PCI Bridge Specification") to emulate or identify a "virtual" PCI-to-PCI bridge 620. The enumeration procedure may then allocate resources at the processing system to communicate with the upstream port 222 as the virtual PCI-to-PCI bridge 620.

Following the initial Type 0 configuration transaction at the upstream port 622, the enumeration procedure may initiate subsequent Type 1 configuration transactions (as illustrated in section 3.1.2.1.1 of the PCI-to-PCI Bridge Specification) at the upstream port 622 to allocate resources enabling communication with each of the downstream ports 624 as a virtual PCI-to-PCI bridge 206. In the course of each of these Type 1 configuration transactions, logic at the switch 210 may provide at the upstream port 622 a configuration header identifying a corresponding downstream port 624 as an emulated or virtual PCI-to-PCI bridge 606 coupled to a secondary bus of the virtual PCI-to-PCI bridge 620. Such logic at the switch 610 may emulate a Type 1 to Type 0 configuration transaction conversion as illustrated in Section 3.2 of the PCI-to-PCI Bridge Specification.

Following each Type 1 configuration transaction to configure resources at the processing system to communicate with a corresponding emulated or virtual PCI-to-PCI bridge 606, the enumeration procedure may initiate a subsequent Type 1 configuration at the upstream port 622 directed to the emulated or virtual PCI-to-PCI bridge 606. The switch 610 may comprise logic to provide a configuration header identifying a corresponding device 618 as a virtual PCI device 608 coupled to an emulated secondary bus of the emulated or virtual PCI-to-PCI bridge 606. Such logic at the switch 610 may emulate Type 1 to Type 1 configuration transaction forwarding as illustrated in section 3.1.2.1.2 of the PCI-to-PCI Bridge Specification.

According to an embodiment, a downstream port 624 may be coupled to a device 618 through a serial link (not shown). In response to a Type 1 configuration request to a corresponding virtual PCI-to-PCI bridge 606, the switch 610 may provide a response to emulate the presence of a PCI bus segment. In response to the indication from the switch 610, the enumeration procedure may associate a bus segment number with the serial link, and allocate resources to the serial link as a PCI bus segment with a single device. However, this is merely an example of how the presence of a bus segment may be emulated in an enumeration procedure and embodiments of the present invention are not limited in this respect.

In the illustrated embodiment, a downstream data packet received at the upstream port 622 from the root device may be associated with destination information comprising an address. The switch 610 may comprise logic to define ranges of addresses for forwarding such downstream data messages to one of the devices 618 coupled to a downstream port 624. For example, the switch 610 may define base and limit registers for each address range associated with each downstream port. A data message received from the root device 604 having an address within an address range defined by such base and limit registers may then be forwarded to the downstream port 624 associated with the address range. The switch 610 may then ignore downstream messages from the root device having an address which does not fall within an address range associated with any of the downstream ports 624.

According to an embodiment, the switch 610 may define base and limit registers for each address range in the course of an enumeration procedure. FIG. 4 shows a schematic diagram illustrating downstream forwarding address ranges over an address map 650 defined by a switch according to an embodiment of the multi-port switch 610 shown in FIG. 3. In the illustrated embodiment, the switch defines address ranges 654, 656 and 658 (e.g., including base and limit registers) for forwarding downstream messages to respective downstream ports. According to an embodiment, the enumeration procedure may model each downstream message address range for a downstream port as an address range for forwarding messages from a primary bus to a secondary bus of a virtual PCI-to-PCI bridge 606 corresponding with the downstream port. Similarly, the enumeration procedure may also model the union of the downstream message address ranges for all downstream ports (e.g., the union of the address ranges 654, 656 and 658) as an address range for forwarding messages from a primary bus to a secondary bus of the virtual PCI-to-PCI bridge 620.

According to an embodiment, the multi-port switch illustrated with reference to FIGS. 8 and 9 may comprise logic to inversely decode the address ranges 654, 656 and 658 (for forwarding downstream messages from the upstream port 622 to the downstream ports 624) to provide address ranges for forwarding messages from downstream ports 624 to the upstream port 622. Accordingly, the switch 610 may forward data messages or packets received at a downstream port 624 to the upstream port 622 if the received data message or packet is associated with a destination address in either address range 652 or 660. The processing system may then model the inverse decoding for forwarding data packets or data messages from the secondary bus to the primary bus of the virtual PCI-to-PCI bridge 620 as illustrated in Chapter 4 of the PCI-to-PCI Bridge Specification.

According to an embodiment, the switch 610 may also comprise logic to forward a data message or data packet received at a first downstream port 624 to a second, destination downstream port 624 independently of the processing system. Such logic at the switch 610 may use destination information associated with the received data message or data packet to inversely decode a destination downstream port 625 from the address ranges 254, 256 and 258 defined for forwarding messages from the upstream port 622. The switch 610 may then forward the received data message or data packet to the inversely decoded downstream port 624. However, this is merely an example of how a switch may forward data packets or messages from a first downstream port to a second downstream port, and embodiments of the present invention are not limited in this respect.

According to an embodiment, the switch 610 may comprise a memory to maintain routing information in a routing table to forward data message or data packets to a destination upstream port 622 or downstream port 624. For example, the switch 610 may comprise logic to build a look-up table to associate address ranges 654, 656 and 658 with respective downstream ports 624 in response to the enumeration procedure, and associate the remaining address ranges 652 and 660 with the upstream port 622. However, this is merely an example of how a switch may maintain routing information to forward data messages or data packets to destination ports and embodiments of the present invention are not limited in this respect.

Figure 9:
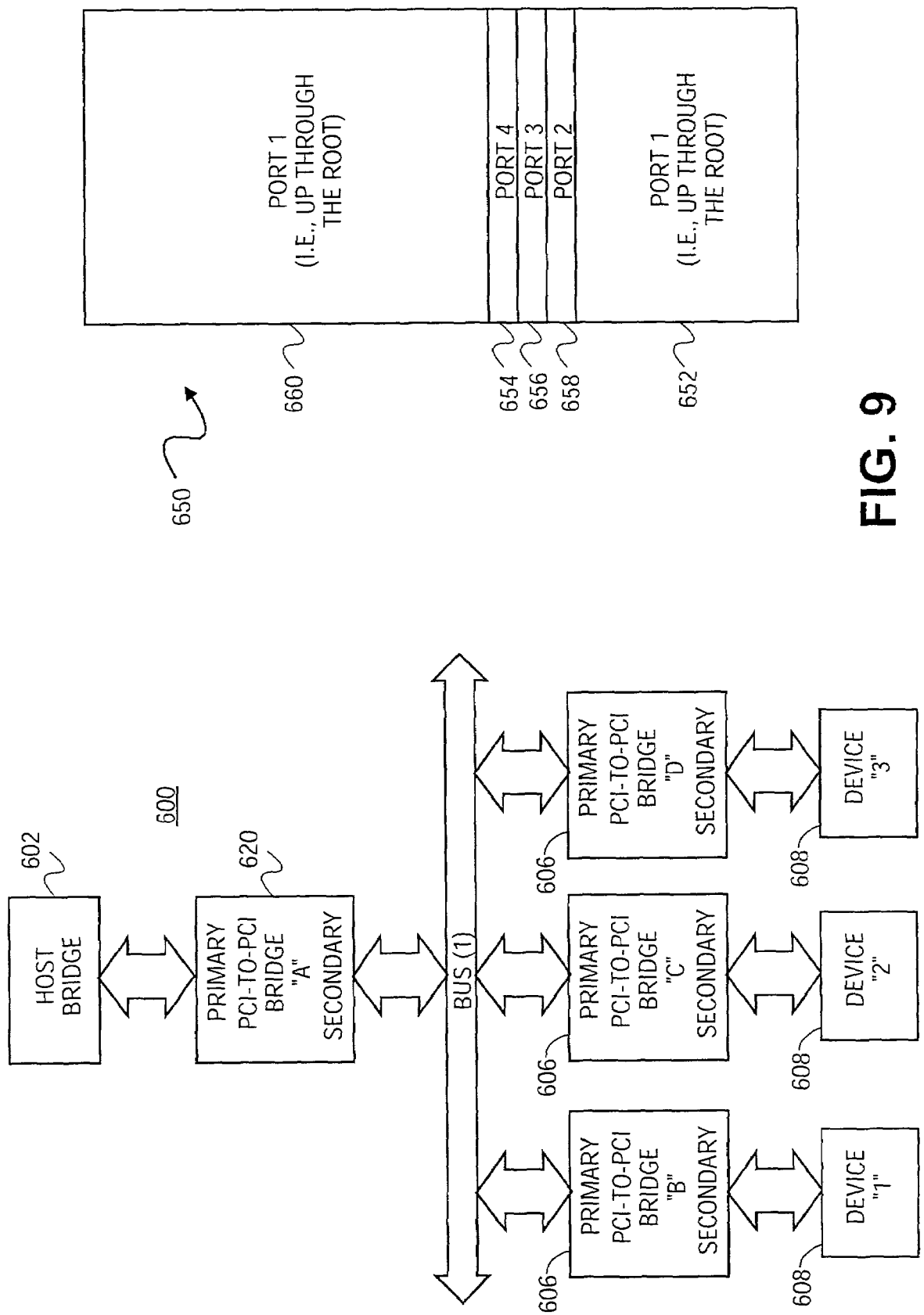
FIG. 9 shows a schematic diagram illustrating the formation of a routing table from a combination of decoded address ranges for transmitting downstream messages and inversely decoding for upstream routing according to an embodiment of the multi-port switch shown in FIG. 8.
Figure 10:
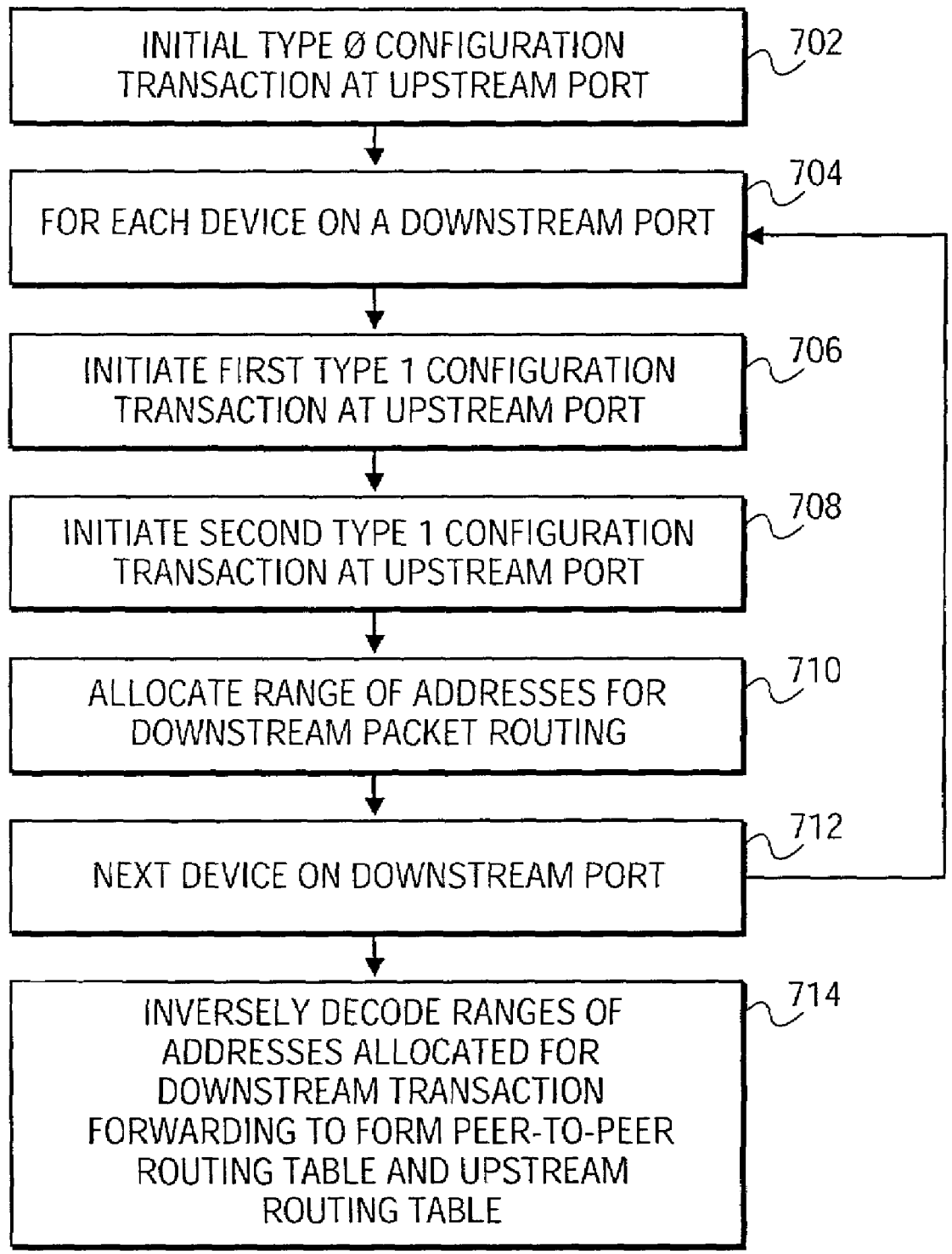
FIG. 10 shows a flow diagram illustrating an enumeration process according to an embodiment of the multi-port switch shown in FIG. 8.

FIG. 10 shows a flow diagram illustrating an enumeration procedure according to an embodiment of the multi-port switch shown in FIGS. 8 and 9. In the illustrated embodiment, a processing system may initiate an enumeration procedure to allocate resources to communicate with the switch 610 as one or more PCI devices using Type 0 and Type 1 configuration transactions as illustrated in Chapter 3 of the PCI-to-PCI Bridge Specification.

At block 302, a Type 0 configuration transaction is initiated at an upstream port of a switch, and the upstream port may return a configuration header identifying a virtual PCI-to-PCI bridge. The enumeration procedure may then initiate subsequent configuration transactions at the upstream port to enumerate additional devices located "behind" the upstream port (e.g., directed to a device coupled to the secondary bus of the virtual PCI-to-PCI bridge) at blocks 706 through 710. For each downstream port of the switch, the enumeration procedure at block 706 may initiate a Type 1 configuration transaction (including a Type 1 to Type 0 conversion) at the upstream port to enumerate the downstream port as a virtual PCI-to-PCI bridge on a secondary bus of the virtual PCI-to-PCI bridge corresponding with the upstream port as illustrated in section 3.1.2.1.1 of the PCI-to-PCI Bridge Specification.

The upstream port may provide a configuration header identifying an associated downstream port as a PCI-to-PCI bridge in response to the Type 1 configuration transaction initiated at block 306. Accordingly, the enumeration procedure may initiate a subsequent Type 1 configuration transaction at block 708 directed to a device on the secondary bus of the virtual PCI-to-PCI bridge corresponding with the downstream port (including a Type 1 to Type 1 forwarding) as illustrated in section 3.1.2.1.2 of the PCI-to-PCI Bridge Specification. In response to the Type 1 configuration transaction initiated at block 710, the upstream port may provide a configuration header identifying the device coupled to the downstream port as a PCI device.

According to an embodiment, the switch comprises logic to provide a configuration header at the upstream port in response to the Type 1 configuration transaction initiated at block 308 based upon information identifying the device coupled to the downstream port. For example, the device at the downstream port may transmit a configuration header to the switch identifying the device as a PCI device. The switch may then forward the configuration header to the upstream port in response to the Type 1 configuration transaction. Alternatively, the switch may comprise logic to form a configuration based upon information identifying one or more functions of the device received at the downstream port. However, this is merely an example of how switch may form a PCI configuration header to characterize a device or function of a device coupled to a downstream port, and embodiments of the present invention are not limited in this respect.

At block 710, the switch may define a range of addresses for forwarding messages from the upstream port to the device. Such a range of addresses may be represented by base and limit registers defined at the upstream port. Following the enumeration procedure at blocks 702 through 712, the switch may use inverse decoding to forward messages from downstream ports to the upstream port, or from a first downstream data port to a second downstream data port as discussed above with reference to FIG. 9. For example, the switch may comprise logic to extract routing information from inversely decoding the address ranges associated with the downstream data ports to form a routing table. The routing table may then be used to forward data messages from a source downstream port to the upstream port or a destination downstream port.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method comprising:

receiving a data packet at an ingress port of a switch coupling a plurality of components within a processing platform in a single computer including a processor, a root device, and one or more peripheral devices, the data packet being received at the ingress port from a first component, the first component being one of the processor, the root device, and the one or more peripheral devices;

the switch initiating a checksum operation on a portion of the received data packet to validate the data packet, while the data packet is being received and before the data packet is received completely;

substantially concurrently with respect to receiving the data packet and the checksum operation, commencing forwarding the received portion of the data packet through a switch fabric of the switch to a transmit queue of an egress port of the switch prior to completion of the checksum operation performed at the ingress port, the egress port coupled to a second component of the processing platform, the second component being one of the processor, the root device, and the one or more peripheral devices and different than the first component, wherein the second component receives a packet invalid symbol inserted at the tail end of the data packet to initiate a first link level retry from the switch for retransmission of the data packet, and wherein the switch initiates a second link level retry on the ingress port for retransmission of the data packet in response to the first link level retry;

the switch sending a configuration header to the processor; and in response to the configuration header, the processor allocating communication resources at the processing platform to communicate with a virtual bridge corresponding to a port of the switch.

2. The method of claim 1, further comprising:

transmitting a CRC indication based on the checksum operation from the ingress port to the transmit queue of the egress port after the data packet has been completely forwarded to the transmit queue of the egress port; and selectively transmitting the forwarded data packet from the transmit queue of the egress port to a the second component if the CRC indication is an a valid CRC indication resulted from the checksum operation performed at the ingress port.

3. The method of claim 2, further comprising selectively dropping the forwarded data packet from the transmit queue of the egress port in response to an invalid CRC indication from the checksum operation.

4. The method of claim 3, further comprising the ingress port inserting the packet invalid symbol into a tail portion of the data packet in response to an invalid CRC indication from the checksum operation, wherein the egress port performs dropping the data packet from the transmit queue in response to the packet invalid symbol received from the ingress port.

5. The method of claim 4, further comprising:

the egress port starting transmitting the data packet to the second component before the data packet has been received completely at the transmit queue of the egress port from the ingress port; and in response to the invalid CRC indication received at an end of the data packet, the egress port transmitting the invalid CRC indication to the second component, wherein the second component drops the data packet received from the egress port in response to the invalid CRC indication.

6. The method of claim 5, further comprising:

extracting destination information from a portion of the received data packet based upon a data packet type associated with the received data packet; and selecting the egress port based upon the destination information, wherein the egress port is communicatively coupled to the second component identified by the destination information.

7. The method of claim 6, further comprising:

selecting the egress port based upon a physical address of the second component specified in the received data packet if the received data packet is associated with a request data packet type; and selecting the egress port based upon an identifier of a source of a request data packet if the received data packet is associated with a request completion data packet type.

8. The method of claim 7, wherein the virtual bridge is a virtual PCI-to-PCI bridge.

9. The method of claim 8, wherein the configuration header identifies an additional virtual PCI-to-PCI bridge coupled to a secondary bus of the virtual PCI-to-PCI bridge, the additional virtual PCI-to-PCI bridge corresponding to an additional port of the switch.

10. The method of claim 9, wherein a virtual device is coupled with the additional virtual PCI-to-PCI bridge.

11. The method of claim 10, wherein the virtual device is coupled with the additional port of the switch through a serial link, and wherein a PCI bus segment number is associated with the serial link in the communication resources.

12. The method of claim 8, wherein the communication resources have an address range for forwarding messages from a primary bus to a secondary bus of the virtual PCI-to-PCI bridge.

13. The method of claim 1, further comprising:

determining an availability of the egress port to transmit the received data packet; and selectively forwarding the received data packet to the transmit queue based upon the availability of the egress port.

14. A switch comprising:

a plurality of ports coupled to a switch fabric, at least one port comprising a transmit queue, the plurality of ports capable of being communicatively coupled to a plurality of components within a processing platform in a single computer including a processor, a root device, and one or more peripheral devices;

a checksum circuit to execute a checksum operation on at least a portion of a data packet received at an ingress port while the data packet is being received and before the data packet is received completely, the ingress port communicatively coupled to a first component of the processing platform and the first component being one of the processor, the root device, and the one or more peripheral devices;

a forwarding circuit to commence, substantially concurrently with respect to the checksum operation, forwarding the received portion of the data packet through the switch fabric to a transmit queue of an egress port prior to completion of the checksum operation performed at the ingress port, the egress port communicatively coupled to a second component of the processing platform and the second component being one of the processor, the chip set, and the one or more peripheral devices different than the first component, wherein the second component receives a packet invalid symbol inserted at the tail end of the data racket to initiate a first link level retry from the switch for retransmission of the data packet, and wherein the switch initiates a second link level retry on the ingress port for retransmission of the data packet in response to the first link level retry; and a responding circuit sending a configuration header to the processor, the processor allocating resources at the processing platform to communicate with a virtual bridge corresponding to a port of the switch in response to the configuration header.

15. The switch of claim 14, wherein the egress port comprises logic to selectively transmit the forwarded data packet from the transmit queue in response to a valid CRC indication from the checksum operation.

16. The switch of claim 15, wherein the egress port comprises logic to selectively drop the forwarded data packet from the transmit queue in response to an invalid CRC indication from the checksum operation.

17. The switch of claim 14, further comprising logic to insert the packet invalid symbol into the forwarded data packet in response to an invalid CRC indication from the checksum operation.

18. The switch of claim 14, wherein the forwarding circuit comprises logic to select the egress port based upon a portion of the received data packet.

19. The switch of claim 18, wherein the forwarding circuit further comprises:

logic to associate the received data packet with a data packet type based upon a portion of the received data packet;

logic to extract destination information from a portion of the received data packet based upon the associated data packet type; and logic to select the egress port based upon the destination information.

20. The switch of claim 19, wherein the forwarding circuit further comprises:

logic to select the egress port based upon a physical address of a destination specified in the received data packet if the received data packet is associated with a request data packet type; and logic to select the egress port based upon an identifier of a source of a request data packet if the received data packet is associated with a request completion data packet type.

21. A processing platform system comprising:

a switch coupled to a processor in a single computer comprising:

a plurality of ports coupled to a switch fabric, at least one port comprising a transmit queue;

a checksum circuit to execute a checksum operation on at least a portion of a data packet received at an ingress port while the data packet is being received and before the data packer is received completely;

a forwarding circuit to, substantially concurrently with respect to the checksum operation, commence forwarding the received data packet through the switch fabric to a transmit queue of an egress port prior to completion of the checksum operation performed to the ingress port, the egress port being coupled to a component, wherein the component receives a packer invalid symbol inserted at the tail end of the data packet to initiate a first link level retry from the switch for retransmission of the data packet, and wherein the switch initiates a second link level retry on the ingress port for retransmission of the data packet in response to the first link level retry; and a responding circuit to send a configuration header to the processor, the processor allocating resources at the processing platform to communicate with a virtual bridge corresponding to a port of the switch in response to the configuration header;

a host processing system coupled to an upstream port of the switch through a root device; and one or more devices coupled to downstream ports of the switch, wherein the ingress and egress ports are respectively one of the upstream and downstream ports of the switch, and wherein the switch couples the host processing system and the one or more devices via one or more interconnect within the processing platform system.

22. The system of claim 21, wherein the egress port comprises logic to selectively transmit the forwarded data packet from the transmit queue in response to a valid CRC indication from the checksum operation.

23. The system of claim 22, wherein the egress port comprises logic to selectively drop the forwarded data packet from the transmit queue in response to an invalid CRC indication from the checksum operation.

24. The system of claim 21, wherein the forwarding circuit further comprises:

logic to associate the received data packet with a data packet type based upon a portion of the received data packet;

logic to extract destination information from a portion of the received data packet based upon the associated data packet type; and logic to select the egress port based upon the destination information.

25. The system of claim 24, wherein the forwarding circuit further comprises:

logic to select the egress port based upon a physical address of a destination specified in the received data packet if the received data packet is associated with a request data packet type; and logic to select the egress port based upon an identifier of a source of a request data packet if the received data packet is associated with a request completion data packet type.

26. The system of claim 21, wherein the forwarding circuit further comprises:

logic to determine an availability of the egress port to transmit the received data packet; and logic to selectively forward the received data packet to the transmit queue based upon the availability of the egress port.

27. The system of claim 21, wherein at least one downstream port is coupled to a device selected from a group consisting of a graphics controller, a small computer system interface, an Ethernet controller, a Fibrechannel interface and a serial ATA device.

* * * * *

UNITED STATES PATENT AND TRADEMARK OFFICE
CERTIFICATE OF CORRECTION

PATENT NO.       : 7,251,704 B2  
APPLICATION NO.  : 10/226838  
DATED            : July 31, 2007  
INVENTOR(S)      : Solomon et al.

Page 1 of 1

It is certified that error appears in the above-identified patent and that said Letters Patent is hereby corrected as shown below:

In column 18, at line 67, delete "packer" and insert --packet--.

In column 19, at line 8, delete "packer" and insert --packet--.

Signed and Sealed this

Twenty Second Day of April, 2008

JON W. DUDAS  
*Director of the United States Patent and Trademark Office*